(12) United States Patent
Shtilerman

(10) Patent No.: US 11,262,101 B2
(45) Date of Patent: Mar. 1, 2022

(54) METHOD AND SYSTEM FOR HEATING WATER

(71) Applicant: ACTIVE HOME LTD., Asseret (IL)

(72) Inventor: Zvi Shtilerman, Asseret (IL)

(73) Assignee: ACTIVE HOME LTD., Asseret (IL)

( * ) Notice: Subject to any disclaimer, the term of this patent is extended or adjusted under 35 U.S.C. 154(b) by 106 days.

(21) Appl. No.: 16/610,538

(22) PCT Filed: Apr. 29, 2018

(86) PCT No.: PCT/IB2018/052968
§ 371 (c)(1),
(2) Date: Nov. 4, 2019

(87) PCT Pub. No.: WO2018/207047
PCT Pub. Date: Nov. 15, 2018

(65) Prior Publication Data
US 2020/0072502 A1 Mar. 5, 2020

Related U.S. Application Data

(60) Provisional application No. 62/503,429, filed on May 9, 2017.

(51) Int. Cl.
*F24H 9/20* (2022.01)
*F24D 11/00* (2022.01)
(Continued)

(52) U.S. Cl.
CPC ......... *F24H 9/2021* (2013.01); *F24D 11/005* (2013.01); *F24D 11/0214* (2013.01); *F24D 19/1054* (2013.01); *F24D 2200/12* (2013.01); *F24D 2200/24* (2013.01); *F24D 2200/31* (2013.01); *F24D 2220/0207* (2013.01); *F24D 2220/0214* (2013.01); *F24D 2220/0228* (2013.01); *F24D 2220/0271* (2013.01); *F24D 2220/042* (2013.01)

(58) Field of Classification Search
USPC ....................................................... 122/14.1
See application file for complete search history.

(56) References Cited

U.S. PATENT DOCUMENTS

| 5,220,807 A | 6/1993 | Bourne et al. |
| 5,226,594 A | 7/1993 | Swenson |

(Continued)

FOREIGN PATENT DOCUMENTS

| CN | 207815564 U | 9/2018 |
| DE | 2530994 A1 | 1/1977 |

(Continued)

*Primary Examiner* — Steven B McAllister
*Assistant Examiner* — John E Bargero
(74) *Attorney, Agent, or Firm* — Mark David Torche; Patwrite Law

(57) ABSTRACT

A method of heating water in a water storage tank. The method includes: selecting an outlet port and an inlet port from at least three ports located in the tank at different heights along a vertical direction. The outlet port is below the inlet port. The method further includes extracting water from the outlet port, supplying the extracted water to an external heat exchanger configured for heating the extracted water, and delivering heated water from the heat exchanger to the selected inlet port.

19 Claims, 9 Drawing Sheets

(51) Int. Cl.
*F24D 11/02* (2006.01)
*F24D 19/10* (2006.01)

(56) References Cited

U.S. PATENT DOCUMENTS

| | | | |
|---|---|---|---|
| 7,594,409 B2 * | 9/2009 | Hayashi | F25B 29/003 62/222 |
| 2002/0002834 A1 * | 1/2002 | Kuroki | F25B 41/31 62/238.6 |
| 2002/0146241 A1 | 10/2002 | Murahashi et al. | |
| 2010/0025031 A1 | 2/2010 | Liu et al. | |
| 2010/0031953 A1 | 2/2010 | Penev et al. | |
| 2011/0139259 A1 * | 6/2011 | Nagata | F24D 19/1069 137/1 |
| 2017/0023263 A1 * | 1/2017 | Tamaki | F24D 3/08 |

FOREIGN PATENT DOCUMENTS

| | | |
|---|---|---|
| EP | 0039315 A1 | 11/1981 |
| EP | 0059692 A2 | 9/1982 |
| WO | 2001/20234 A1 | 3/2001 |
| WO | 2013/079738 A1 | 6/2013 |

* cited by examiner

METHOD AND SYSTEM FOR HEATING WATER

FIELD OF THE INVENTION

The present invention relates to heating and, more particularly, but not exclusively, to a method and system for heating water in a water storage tank.

BACKGROUND OF THE INVENTION

Certain water heater appliances include a tank. During operation a heating element, such as a gas burner, an electric resistance element or an induction element, heats water within the tank. In household appliances, the water is heated to a temperature suitable for showering, washing hands, washing dishes, and so forth. There is an increasing need for saving on energy consumed in order to heat water, and several attempts have been made to collect the (otherwise lost) heat that is dissipated in a condenser of a refrigeration appliance for the purpose of heating water.

European Patent Publication EP0059692 discloses a combined refrigerating and hot water device that includes a compressor for compressing the refrigerating fluid, a condenser for condensing the refrigerating fluid from the compressor, a capillary tube for expanding the refrigerating fluid from the condenser, evaporating means for evaporating the refrigerating fluid from the capillary tube and, a return pipe connecting the outlet of the evaporating means to the input of the compressor. Heat available at the condenser is collected and stored by ensuring that cold water can only circulate from a bottom of a water tank to a water heater; and that hot water only circulates from the water heater to the top of the water tank or to a hot water pipe.

International Patent Publication WO 2001/020234 discloses a water heater that utilizes excess heat generated by a refrigeration cycle for heating water. The water heater utilizes a heat pump cycle that heats water from the heat accumulated in the refrigerant of the refrigeration system. The heat pump cycle is modified such that when there is need for refrigeration, the heat produced from compression of the refrigerant is selectively captured for water heating by a water-cooled condenser. When refrigeration is not needed by the refrigeration system, ambient heat is transferred to the water-cooled condenser.

Additional background art includes International Patent Publication WO 2013/079738, German Application Publication DE 2530994, U.S. Pat. No. 5,220,807, and European Patent Publication EP 0039315.

SUMMARY OF THE INVENTION

According to embodiments of one aspect of the present invention there is provided a method of heating water in a water storage tank. The method includes: selecting an outlet port and an inlet port from at least three ports located in the tank at different heights along a vertical direction, the outlet port being below the inlet port; extracting water from the outlet port; supplying the extracted water to an external heat exchanger configured for heating the extracted water; and delivering heated water from the heat exchanger to the selected inlet port.

According to some embodiments, the method is executed in a plurality of execution cycles, wherein in at least one of the execution cycles the outlet port is a port other than the lowermost port of the at least three ports.

According to some embodiments, the outlet ports include a lowermost port, a middle port and an uppermost port, wherein the method is executed a plurality of execution cycles, and wherein in at least one of the execution cycles the outlet port is the middle port and in at least one of the execution cycles the inlet port the is the middle port.

According to some embodiments, there are at least four ports located at different vertical heights along the tank.

According to some embodiments, the method includes selecting the outlet port from a first pair of the at least four ports, and selecting the inlet port from a second pair of the at least four ports.

According to some embodiments, the heat exchanger includes a condenser of a refrigerator, a heat pump or an air conditioner.

According to some embodiments of the invention the heat exchanger includes a solar collector of a solar water heating system.

According to some embodiments, the selecting is according to a predetermined temperature protocol. According to some embodiments, the selecting is according to a predetermined timing protocol.

According to some embodiments, the method includes receiving user input pertaining to a beginning and an end of a time-interval, wherein the selection is according to a timing protocol selected based on the user input.

According to some embodiments, the timing protocol is one of a plurality of pre-programed timing protocols.

According to some embodiments, the method includes measuring the temperature of the water at the heat exchanger, wherein the selecting is based on the measured temperature.

According to some embodiments, the method includes selecting the inlet port such that the temperature at the inlet port is higher than the temperature of the heated water delivered from the heat exchanger to the selected inlet port.

According to some embodiments, the method is executed intermittently.

According to embodiments of another aspect of the present invention there is provided a system for heating water. The system includes: a water storage tank, for holding the water and including at least three ports located in the tank at different heights along a vertical direction; a heat exchanger external to the tank; a controller, supplemented by a controllable valve system and being configured to automatically select an outlet port and an inlet port from the at least three ports; an arrangement of conduits arranged to circulate water from the tank through the selected outlet port, via the heat exchanger for heating of the extracted water, and into the storage tank through the selected inlet port.

According to some embodiments, the system includes a refrigerator or an air conditioner having an air-cooled condenser and a water-cooled condenser, wherein the heat exchanger includes the water-cooled condenser.

According to some embodiments, the system includes a heat pump having a water-cooled condenser, wherein the heat exchanger includes the water-cooled condenser.

According to some embodiments, the heat exchanger includes a solar collector of a solar water heating system.

According to some embodiments, the system includes a pump for effecting the circulation.

According to some embodiments, the arrangement of conduits is devoid of a mechanical circulation pump, wherein the circulation is by a thermo-siphonic flow.

According to some embodiments, the controller is configured to execute a temperature protocol for the automatic selection. According to some embodiments, the controller is configured to execute a timing protocol for the automatic selection, wherein the timing protocol is different at night time than at daytime.

According to some embodiments, the automatic selection is according to a pre-programmed timing protocol.

According to some embodiments, the system includes a user interface for receiving user input pertaining to a beginning and an end of a time-interval, wherein the automatic selection is according to a timing protocol selected automatically based on the user input.

According to some embodiments, the timing protocol is one of a plurality of pre-programmed timing protocols.

According to some embodiments, the system includes a temperature sensor for measuring the temperature of the water at the heat exchanger, wherein the automatic selection is based on the measured temperature.

According to some embodiments, the controller is configured to select the inlet port such that the temperature at the inlet is higher than the temperature of the heated water delivered from the heat exchanger to the selected inlet port.

According to some embodiments, the controller is configured for intermittent execution.

According to some embodiments, the heat exchanger includes a condenser of a refrigerator having a freezer compartment, wherein the intermittent execution includes at least one execution cycle during which the condenser extracts heat from the freezer compartment, and at least one execution cycle during which the condenser extracts heat from ambient air outside the refrigerator.

According to some embodiments, the heat exchanger includes a water cooled condenser of an air conditioner having, in addition to the water cooled condenser, an air cooled condenser, an evaporator and a compressor, wherein there are at least two different operation modes performed by the method or capable of being performed by the system, and wherein in a first of the two different operation modes a pairwise connection is established between the water cooled condenser and the air cooled condenser, and between the evaporator and the compressor, and in a second of the two different operation modes a pairwise connection is established between the water cooled condenser and the evaporator, and between the air cooled condenser and the compressor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software, by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
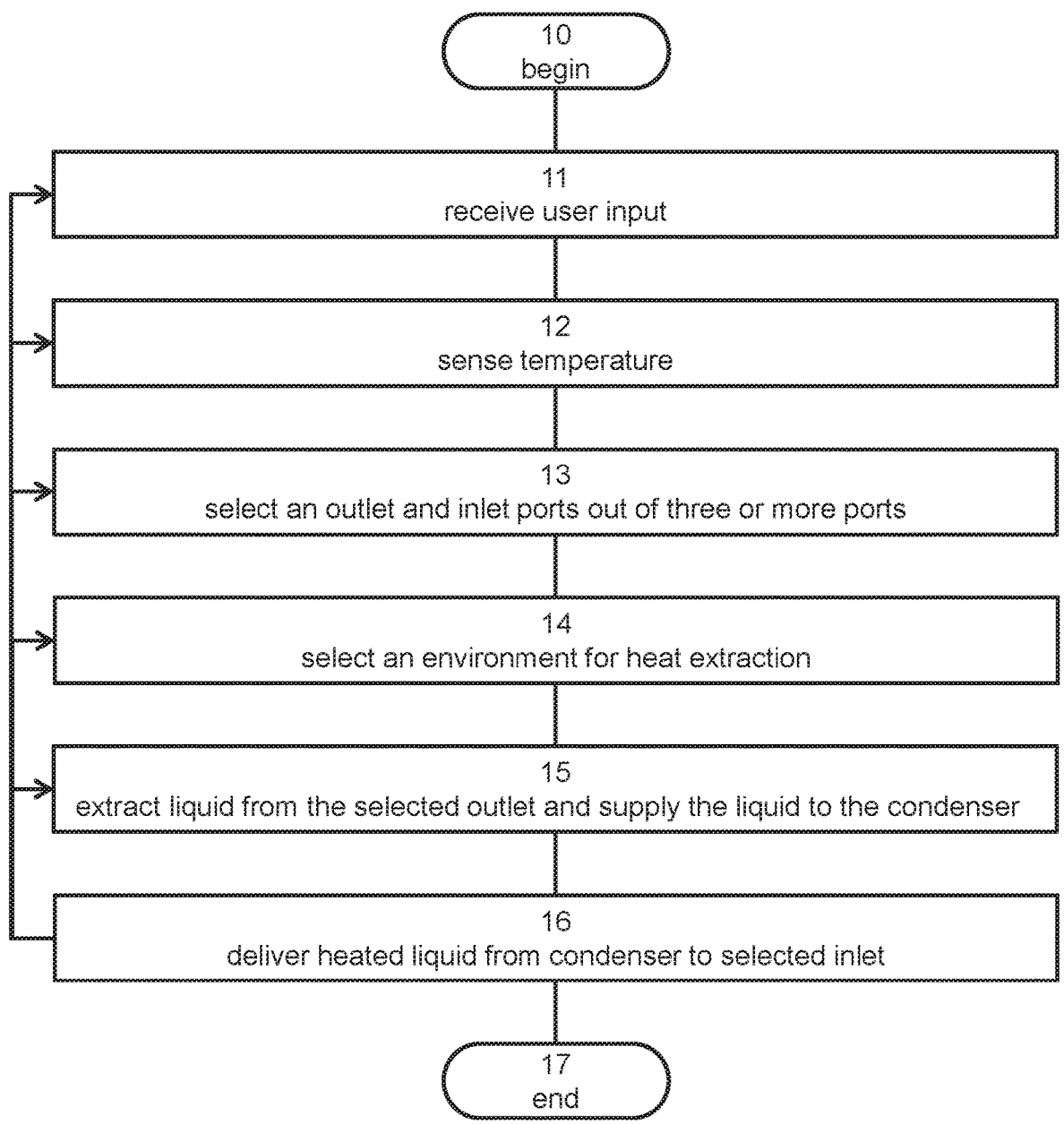
FIG. 1 is a flowchart diagram of a method suitable for heating water in a water tank according to various exemplary embodiments of the present invention.

The present invention relates to heating and, more particularly, but not exclusively, to a method and system for heating water in a water storage tank.

It is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Some embodiments of the present invention exploit the heat released from a heat exchanger, such as, but not limited to, a water-cooled condenser or a solar collector for the purpose of heating water. The present inventor found that technologies that attempt to exploit the condenser of a refrigerator to heat water are inefficient, technologically difficult to employ, or otherwise not practical. Some traditional techniques (e.g., as described in U.S. Pat. No. 5,220,807) place the condenser in a container filled with water to be heated. This technique increases the average condensation temperature of the refrigerant in the condenser, leading to an increase in the power consumption of the compressor of the refrigerator, and therefore to a decreased efficiency. Other techniques (e.g., as described in International Patent Publication WO 2001/020,234) place the condenser outside the water container, and employ conduits for delivering water to the condenser from the lower portion of the container, and from the condenser into the upper portion of the container. The present inventor found that when the temperature of the water at the lower portion of the container begins to rise, the condensation temperature of the refrigerant in the condenser also rises, since water at higher temperature is supplied to the condenser. This solution also suffers from poor efficiency since with higher condensation temperature the power consumed by the compressor is also high. Also if the water temperature at the uppermost section of the tank is higher than the supplied water temperature, the newly supplied water may cool the uppermost section. For these reasons, these technologies have met with little, if any, commercial acceptance.

While conceiving the present invention, the Inventor found that controlling the location within the water tank that receives the heated water can significantly increase the efficiency of the heating.

FIG. 1 is a flowchart diagram of a method suitable for heating water in a water storage tank according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at step 10 and optionally and preferably continues to step 11 at which a user input is received. The user input can pertain, for example, to a temperature goal at one or more sections of the water tank at the end of the heating process, to a beginning and an end of a time-interval during which the heating process is to take place, and/or to lengths of heating cycles during heating process. The user input can, alternatively or additionally, pertain to the current season of the year, and/or the current climate, and/or a power consumption budget and the like. Alternatively, the method can operate without receiving user input.

The method can optionally and preferably continue to step 13 at which an outlet port and an inlet port are selected from three or more ports located at different heights of the tank.

As used herein "height" is measured along the vertically upward direction (opposite to the gravitational force), and the term "above" and "below" indicate relative positions along the vertically upward direction.

The outlet port and inlet port selections are typically according to a temperature protocol and/or a timing protocol which can be pre-programed in a controller or be selected based on the user input.

The method can optionally and preferably continue to step 14 at which an environment for heat extraction is selected. Typically, the method selects one of two environments, wherein the two environments include an internal environment that is intended to be cooled, and an external environment which is outside the environment that is intended to be cooled. For example, the internal environment can be a freezer compartment of a refrigerator, or an indoor environment cooled by an air-conditioner, and the external environment can be an ambient environment outside the refrigerator, or an outdoor environment outside the indoor environment, into which the air-conditioner evacuate heat.

The selection between the environments can be executed by a refrigerant controller of the refrigerator. Specifically, when the refrigerant controller establishes a flow of refrigerant into an evaporator in the internal environment, the internal compartment is selected, and when the refrigerant controller establishes a flow of refrigerant into an evaporator in the external environment (for example, into an air-cooled condenser serving as an evaporator), the external environment is selected. A representative example of an operation of a refrigerant controller is described below.

The method can continue to step 15 at which water is extracted from the selected outlet port and is supplied to a heat exchanger for heating of the extracted water by the heat exchanger. The heat exchanger is outside the tank. The heat exchanger can be a water-cooled condenser of an appliance, preferably a household appliance, such as, but not limited to, a refrigerator (e.g., a household refrigerator) or an air conditioner (e.g., a household air conditioner) or a heat pump (e.g., a household heat pump). The condenser is "water-cooled" in the sense that the extracted water absorbs heat from the condenser and therefore cools the condenser. The heat exchanger can alternatively be a solar collector of a solar water heating system. In embodiments in which step 14 is executed, heat exchanger extracts heat from the selected environment, as further detailed below.

In some embodiments of the present invention one or more of operations at steps 13 and 15 and optionally and preferably also at step 14 (when employed) are preceded by an operation at step 12 at which a temperature is sensed at one or more locations. The sensing can be done by one or more temperature sensors placed in the respective location(s) and transmitting signals to a controller. The temperature can be sensed, for example, at the entry point of water into the heat exchanger. Also contemplated, are embodiments in which the temperature is sensed at one or more of the ports in the tank, and/or one or more of the conduits delivering water into or out of the tank. Sensing the temperature is advantageous since it allows the controller executing the method to judicially select the inlet port, outlet port, and optionally also the environment for heat extraction based on the sensed temperature. This is typically done by comparing the measured temperature(s) to one or more predetermined temperature thresholds, wherein the inlet port, outlet port, and optionally also the environment for heat extraction is/are selected based on this comparison. The temperature thresholds can be selected based on the current season of the year, the current or expected climate, and the like.

For example, when the temperature is sensed at the entry to the heat exchanger, the sensed temperature can be compared to a first predetermined temperature threshold (for example, from about 34° C. to about 36° C. in cold seasons, and from about 38° C. to about 40° C. in warm seasons). When the sensed temperature reaches or exceeds the first predetermined temperature threshold, a lower outlet port can be selected. When the sensed temperature reaches the first predetermined temperature threshold while or after the water has already been extracted from the lowermost port of the tank, the method can cease the extraction of water from the tank and the delivery of water to the heat exchanger. In cases in which the environment from which the heat is extracted is the external environment (e.g., ambient air outside a refrigerator or outside the tank), the measured temperature can be compared to a second predetermined temperature threshold, which is optionally and preferably higher than the first temperature threshold (e.g., from about 43° C. to about 47° C.). When the sensed temperature reaches or exceeds the second predetermined temperature threshold, the method can select a different environment, typically the inner environment, (e.g., the freezer compartment of the refrigerator) for extracting the heat, and may optionally also cease the delivery of water to the heat exchanger.

The method can then continue to step 16 at which heated water is delivered from the heat exchanger to the selected inlet port. Execution of step 16 completes a cycle of the method, where the cycle can begin at steps 11 or 12 or 13 or 14 or 15, depending which of these operations is executed. The method can then loop back to any of operation steps 11, 12, 13, 14 or 15 for re-execution of another cycle.

The method ends at step 17.

The method is optionally and preferably executed intermittently. In these embodiments, operation steps 15 and 16 are executed for a first time period, and then the method pauses for a second time period. During the first time period, the appliance performs work for heating the water in the tank. During the pause, the appliance can return to its normal operation (e.g., when the appliance is a refrigerator, cooling the internal compartments of the refrigerator using an air-cooled condenser) or pause, without investing work in heating the water in the tank.

The intermittent execution is characterized by an execution duty cycle, defined as the ratio between the first time period and the sum of the first and second time periods. As a representative example, which is not to be considered as limiting, the method can be executed for a period of from about 6 to about 36 minutes every hour. In this example, the first period is from about 6 to about 36 minutes, and the sum of the first and second time periods is 60 minutes, so the execution duty cycle is from about 10% to about 60%. Each of the first and second time periods can also be intermittent.

The execution duty cycle, the first period and the second time period are optionally and preferably different during day time than during night time, and may also be different during different seasons of the year, different climate conditions and the like. Typically, but not necessarily, the duty cycle is lower at night time than at daytime, and also lower during warmer seasons or climate conditions than during colder seasons or climate conditions.

In embodiments of the invention in which the heat exchanger is a water-cooled condenser, the method optionally and preferably employs at least one execution cycle during which the condenser extracts heat from a first environment, and at least one execution cycle during which the condenser extracts heat from a second environment, where the environments are different from each other (for example, the first environment can be the internal environment and the second environment can be the external environment). In some embodiments of the present invention the method employs at least one execution cycle during which the condenser extracts heat from the internal environment (e.g., a freezer compartment of a refrigerator), in some embodiments of the present invention the method employs at least one execution cycle during which the condenser extracts heat from the external environment (e.g., an ambient air outside a refrigerator), and in some embodiments of the present invention the method employs at least one execution cycle during which the condenser extracts heat from the internal environment (e.g., the freezer compartment of the refrigerator) and at least one execution cycle during which the condenser extracts heat from the external environment (e.g., the ambient air outside the refrigerator).

In various exemplary embodiments of the invention there are at least two execution cycles in which the heated water enters the tank through different inlet ports. For example, the method can execute a first execution cycle at which a first port is selected as the inlet port and a second execution cycle at which a second port is selected as the inlet port. In a preferred embodiment, the first execution cycle precedes the second execution cycle, and the first port is above the second port. This is advantageous because the water in the upper section of the tank is typically cooler during the earlier cycle than during the later cycle so that it is less typical for the heated water to cool the upper section during this cycle. On the other hand, during the later cycle the water temperature in the upper section of the tank are substantially higher than those at the lower parts, and so the heated water entering directly to a lower section can efficiently heat the water also at the lower section.

A representative example of an execution protocol according to some embodiments of the present invention is as follows. The first time period includes a first sub-period during which heat is extracted from the internal environment (e.g., the freezer of the refrigerator) and water is extracted through port 26a and delivered through port 26b, and a second sub-period during which heat is extracted from the external environment (e.g., the ambient air) and water is extracted through port 26a and delivered through port 26c. The first sub-period can be before or after the second sub-period. Following or between these sub-periods, the method can pause for the second time period.

FIGS. 2A-2D are schematic illustrations of a system 20 for heating water 22, according to some embodiments of the present invention. System 20 includes a tank 24 having three or more ports and holding water 22. FIGS. 2A-2D show four ports 26a-26d, but this need not necessarily be the case, since, for some applications, it may not be necessary for tank 24 to include four ports, since the number of ports can be fewer than four (e.g., three) or more than four (e.g., five or more).

Figure 2A:
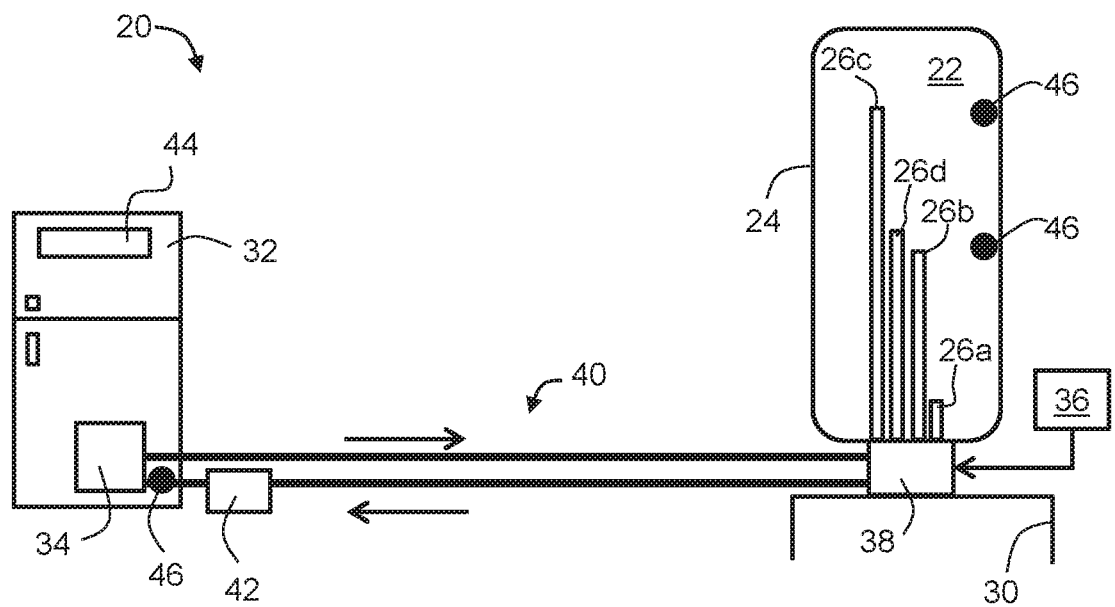
FIGS. 2A-2D are schematic illustrations of a system for heating water, according to some embodiments of the present invention.
Figure 2B:
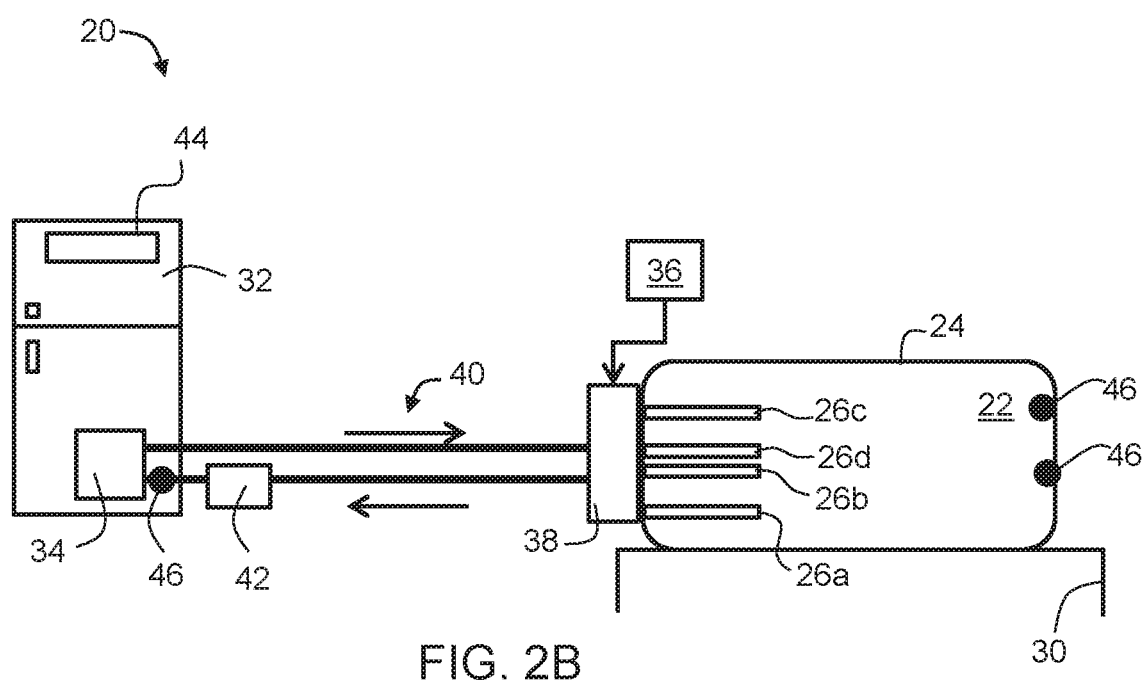
Figure 2C:
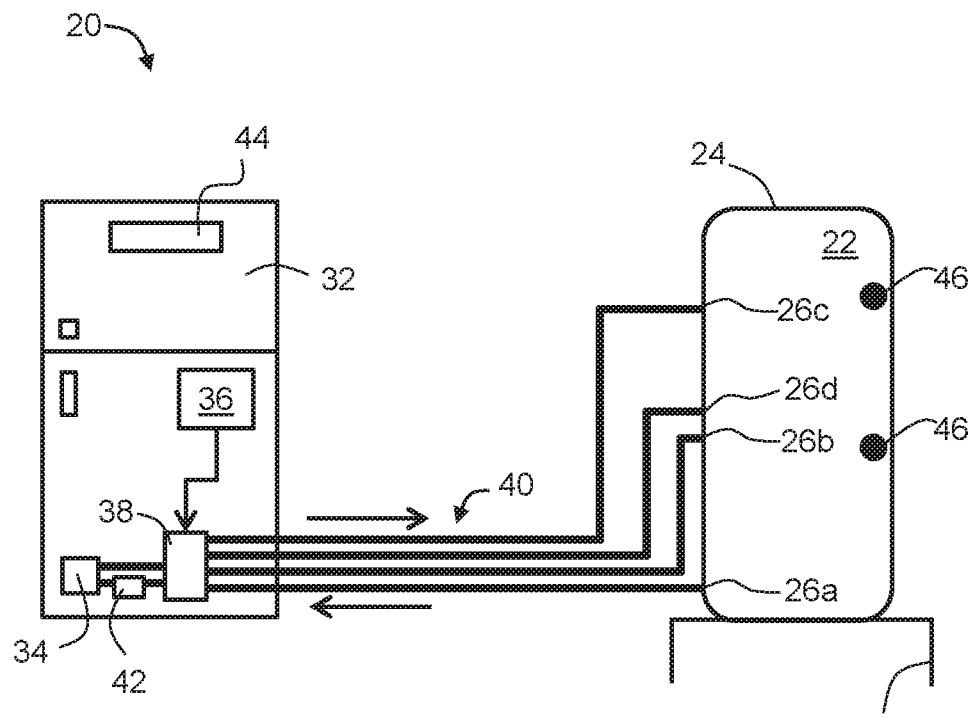
Figure 2D:
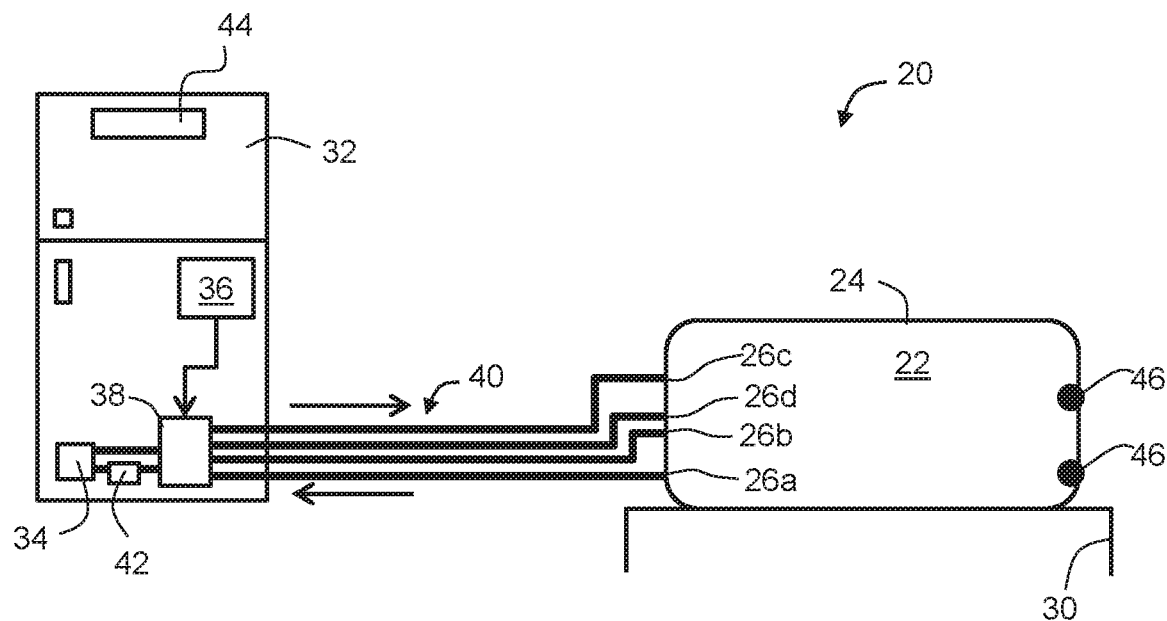

Tank 24 may be a residential water tank. Tank 24 is typically disposed on a support 30 either in an upright position such that its side wall is vertical (FIGS. 2A and 2C) or in a rotated position such that its side wall is horizontal (FIGS. 2B and 2D). Tank 24 is typically cylindrical, but can have any other shape. Ports 26a-26d are located within tank 24 and are at different heights along the vertical direction of the tank.

Preferably, there is at least one port (e.g., port 26c) at a height that divides the internal volume of tank 24 such that less than half of the volume is above the port; at least one port (e.g., ports 26b and 26d) at a height that divides the internal volume of tank 24 such that more than half but less than 80% of the volume is above the port, and at least one port (e.g., port 26a) at a height that divides the internal volume of tank 24 such that more than 90% or more than 95% of the volume is above the height of the port.

As a representative example, which is not to be considered as limiting, port 26c is at a height that divides the internal volume of tank 24 to a ratio of about 25:75, where the smaller portion (25% in this example) is above the height of port 26c; port 26d is at a height that divides the internal volume of tank 24 to a ratio of about 70:30, where the larger portion (70% in this example) is above the height of port 26d; port 26b is at a height that divides the internal volume of tank 24 to a ratio of about 75:25, where the larger portion (75% in this example) is above the height of port 26b; and port 26a is at a height that divides the internal volume of tank to at a ratio of at least 95:5, where the larger portion (95% or more in this example) is above the height of port 26a.

System 20 also includes a heat exchanger 34 disposed outside tank 24. Heat exchanger 34 can be a water-cooled condenser of appliance 32 liquefying a refrigerant gas (not shown) to release heat. Alternatively, heat exchanger 34 can be a solar collector collecting solar radiation to heat water flowing therein.

Typically, appliance 32 also includes an air-cooled condenser (not shown, see FIGS. 3A-3D, 5A and 5B). Appliance 32 is illustrated in FIGS. 2A-2D as a refrigerator, but any appliance, optionally and preferably a household appliance, having a water-cooled condenser, can be used. For example, appliance 32 can be an air to water heat pump, which, unlike a refrigerator, does not necessarily include a compartment that is maintained cooler than the environment. Alternatively appliance 32 can be an air conditioner, preferably a household air conditioner. Representative examples of a heat pump and an air conditioner suitable for the present embodiments are provided below. Tank 24 and appliance 32 can be spaced apart from each other.

In various exemplary embodiments of the system 20 includes a controller 36, supplemented by a controllable valve system 38. Controller 36 and valve system 38 can be provided as separate systems, as illustrated in FIGS. 2A-2D or they can be provided within the same encapsulation, e.g., as a monolithic system. Each of controller 36 and valve system 38 can be positioned in proximity to or within the appliance 32 (FIGS. 2C-2D), or mounted on or positioned in proximity to the tank 24 (FIGS. 2A-2B). Controller 36 transmits operation signals to valve system 38 to select an outlet port and an inlet port from the ports 26a-26d of tank 24. In some embodiments, controller 36 transmits operation signals to a refrigerant controller (not shown, see FIGS. 3A-3D, 5A and 5B) of appliance 32 to control the flow of the refrigerant, and thereby to select the environment for heat extraction, as further detailed below.

System 20 can further include an arrangement of conduits 40 that circulate the water. The circulation is optionally and preferably from tank 24 through one of ports 26a-26d, via heat exchanger 34 that heats the water, and back into tank 24 through another port, where the port through which the water enters tank 24 is disposed above the port through which the water exits tank 24. When valve system 38 is positioned in proximity to or within appliance 32 (FIGS. 2C-2D), the number of arranged conduits 40 is preferably at least the total number of inlet ports and outlet ports (four, in the illustrated embodiments) to allow valve system 38 to individually control each outlet port and optionally also each inlet port. When valve system 38 is mounted on or positioned in proximity to tank 24 (FIGS. 2A-2B), it is sufficient to include two conduits 40, one for delivering the extracted cold water from tank 24 and the other for delivering the heated water back into tank 24.

The circulation within conduits 40 can be effected by a pump 42, which can be of any type known in the art, such as, but not limited to, a centrifugal pump, a piston pump, a screw pump, a diaphragm pump and the like. The circulation can alternatively or additionally be effected by a thermo-siphonic flow. When appliance 32 is an air conditioner, the circulation within conduits 40 is preferably effected by pump 42. In some embodiments, the arrangement of conduits 40 is devoid of any mechanical pump and the circulation is by thermo-siphonic flow.

Controller 36 is optionally and preferably configured to execute a timing protocol for selecting the outlet port and/or inlet port. In some embodiments, the timing protocol is pre-programed in controller 36. Preferably, the timing protocol is different at night time than at daytime and/or different in different seasons and/or different climate conditions. In various exemplary embodiments, controller 36 ensures intermittent execution of the circulation of water in conduits 40, for example, as a set of execution cycles with pauses between cycles, as further detailed herein.

System 20 can optionally and preferably include a user interface 44 for receiving user input. In these embodiments, the timing protocol is optionally and preferably selected automatically by controller 36 based on the user input that controller 36 receives from user interface 44. The user interface 44 can be of any type known in the art, including, without limitation, a keyboard, a touch screen, a voice activated interface, one or more physical buttons, and the like. The user interface can also be remote from appliance 32 and tank 24. For example, user interface can be embodied as a mobile device such as, but not limited to, a smartphone, a tablet, a smartwatch and a remote control, that wirelessly transmits the user input to the appliance. The user input can pertain, for example, to a temperature goal at one or more sections of the water tank at the end of the heating process, to a beginning and an end of a time-interval during which the heating process is to take place, and/or to lengths of heating cycles during heating process, and the like. The user input can, alternatively or additionally, pertain to the current season of the year, and/or the current climate, and/or a power consumption budget and the like.

The user input can be used by the controller 36, for example, for setting the execution duty cycle, according to which the water is circulated in conduits 40. As a representative example, when the user input pertains to a temperature goal and to a beginning and an end of a time-interval during which the heating process is to take place, controller 36 can select the execution duty such that the total amount of thermal energy that is delivered to the tank 24 during this time period is sufficient to increase the temperature of the water to the temperature goal. When the user input also pertains to the current season of the year, controller 36 can reduce the execution duty cycle at summer time and spring times and increase the execution duty cycle at winter and autumn times.

In some embodiments, controller 36 transmits control signals to valve system 38 to select the inlet port such that a temperature at the selected inlet port is higher than a temperature of the delivered water. In some optional embodiments, system 30 includes one or more temperature sensors 46 for measuring a temperature of water 22 at one or more locations selected from the group consisting of port 26a, port 26b, port 26c, port 26d, the water entry port of heat exchanger 34, and the water exit port of heat exchanger 34. In these embodiments controller 36 can use signals generated by these sensors for selecting the outlet port and/or inlet port. The selection can be based on signals from a single sensor or two or more sensors. Controller 36 can compare the measured temperature(s) to one or more predetermined temperature thresholds, wherein the inlet port, outlet port, and optionally also the flow of the refrigerant, is/are selected based on this comparison, as further detailed herein. The temperature thresholds can be selected based on the current season of the year, the current or expected climate, and the like, as further detailed herein.

The selection can alternatively or additionally be based on a temperature difference between the temperature of the water at heat exchanger 34 and the temperature at the respective inlet port or outlet port. For example, controller 36 can select port 26c as the inlet port when the temperature of the water at heat exchanger 34 is higher than the temperature of port 26d, and port 26d as the inlet port otherwise. For clarity of presentation, FIGS. 2A-2B illustrate three sensors 46 and FIGS. 2C-2D illustrate two sensors 46, but the skilled person would have no difficulty to place the temperature sensors at the appropriate locations for measuring the respective temperatures.

FIGS. 3A-3D are schematic block diagrams illustrating appliance 32, according to some embodiments of the present invention. FIGS. 3A-3D are particularly suitable when appliance 32 is embodied as a refrigerator but are also useful when appliance 32 is embodied an air conditioner. Appliance 32 includes a compressor 62, an air-cooled condenser 64, water-cooled condenser 35, and an evaporator 66. Appliance 32 can further include a refrigerant controller 70 that controls a plurality of valves 72, 74 and 76 and optionally also compressor 62. Each of air-cooled condenser 64 and evaporator 66 is typically provided with a fan for generating air flow thereby enhancing heat exchange with environmental air as known in the art. These fans are shown as fans 65 and 67, respectively.

For clarity of presentation control lines from refrigerant controller 70 to the valves and the compressor are not illustrated. Refrigerant controller 70 can receive control signals from controller 36 of system 20 (not shown, see FIGS. 2A-2D). While the embodiments below are described with a particular emphasis to a configuration in which refrigerant controller 70 is controlled by controller 36, this need not necessarily be the case, since some embodiments of the present invention contemplate a configuration in which controller 36 can control the valves directly, hence serve also as a refrigerant controller, in which case it is not necessary for a separate controller for system 20 and appliance 32.

Evaporator 66 is typically placed in an environment that is intended to be cooled, and is configured to extract heat from this environment when a refrigerant is evaporated therein. For example, when appliance 32 is embodied as a refrigerator, evaporator 66 can be placed in the freezer compartment (not shown) of the refrigerator to extract heat from the freezer compartment, and when appliance 32 is embodied as an-air conditioner, evaporator 66 is typically placed indoors (e.g., within a wall-mounted unit) and is configured to extract heat from the indoor environment. Air-cooled condenser 64 and water-cooled condensers 35 are both typically placed outside the environment that is intended to be cooled (e.g., outside the refrigerator compartments when appliance 32 is a refrigerator, and outside the indoor environment when appliance 32 is an air conditioner) wherein air-cooled condenser 64 is configured to exchange heat with ambient air outside the environment that is intended to be cooled, and water-cooled condenser 35 is configured to exchange heat with the water in conduits 40, as further detailed herein.

Figure 3A:
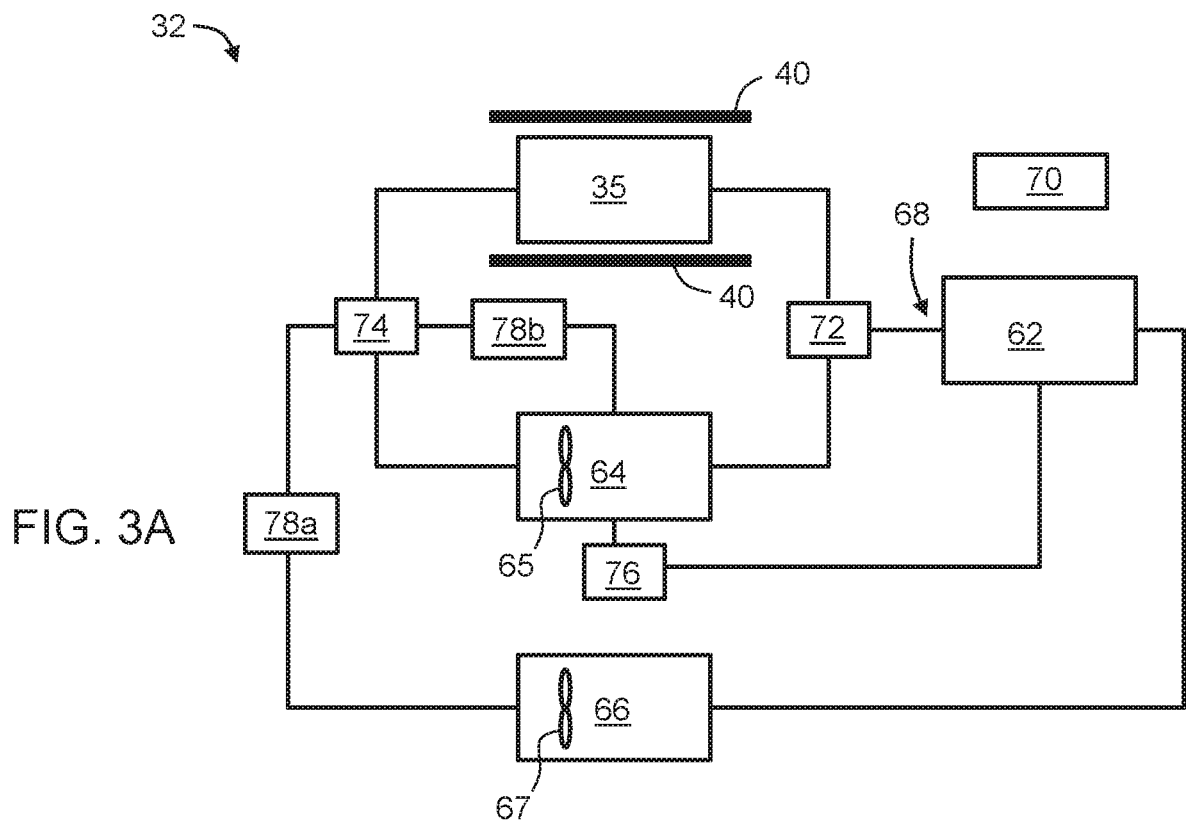
FIGS. 3A-3D are schematic block diagrams illustrating an appliance having two condensers, which can be used according to some embodiments of the present invention.
Figure 3B:
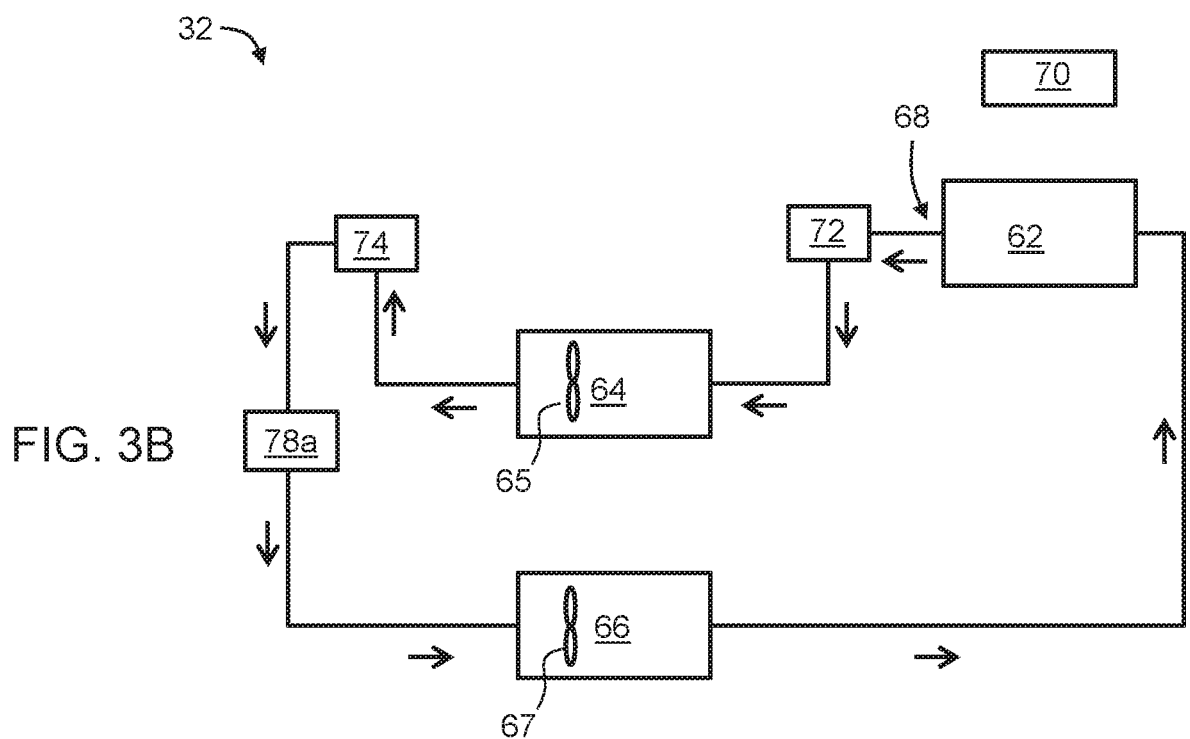

In operation, compressor 62 provides a compressed refrigerant at an output 68 thereof. Refrigerant controller 70 selects, by means of valve 72, whether the compressed refrigerant flows to air-cooled condenser 64 or water-cooled condenser 35. During a time period in which the heating process of the water in tank 24 pauses, controller 36 transmits signals to refrigerant controller 70 to direct the compressed refrigerant into air-cooled condenser 64. During this period, controller 36 also transmits signals to refrigerant controller 70 to controls valve 74 such as to allow the refrigerant to continue from air-cooled condenser 64, preferably via an expansion valve 78a, to evaporator 66 and back to compressor 62. The flow path in this operation mode of appliance 32 is illustrated in FIG. 3B.

Figure 3C:
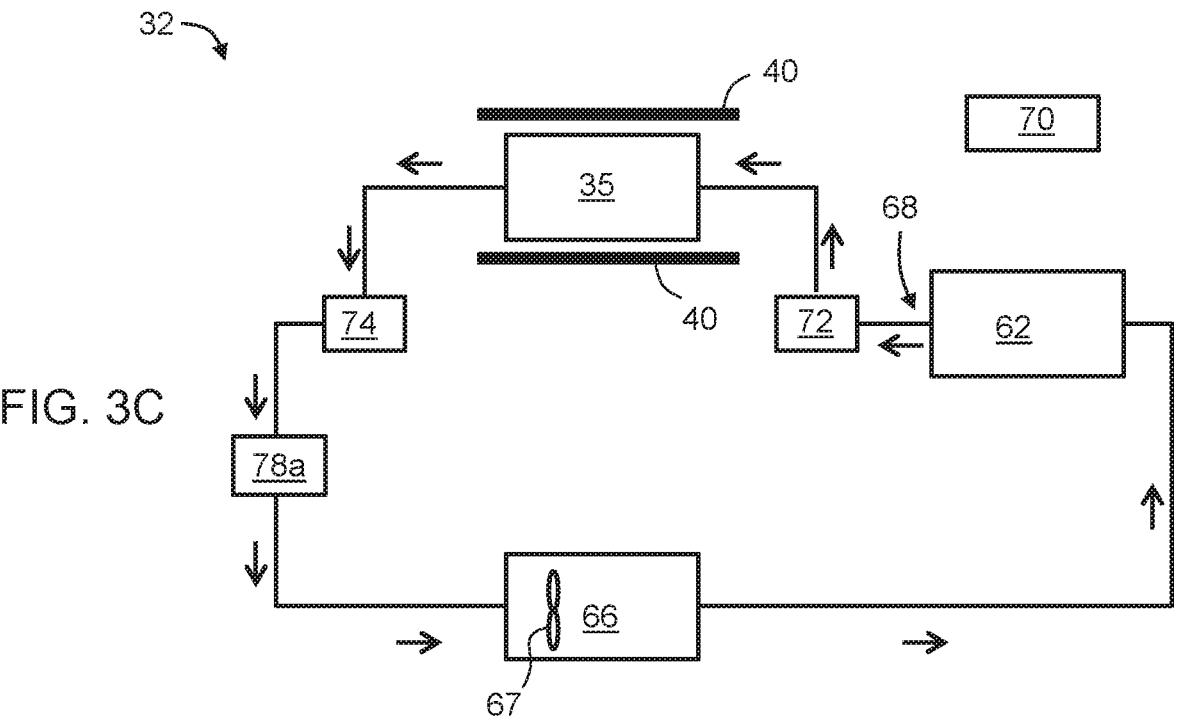

During a time period in which the heating process of the water in tank 24 is executed, controller 36 transmits signals to refrigerant controller 70 to direct the compressed refrigerant into water-cooled condenser 35. In response to signals from controller 36, refrigerant controller 70 controls valve 74 to direct the refrigerant either to evaporator 66 (preferably via expansion valve 78a) or to air-cooled condenser (preferably via expansion valve 78b). When it is desired to extract heat from the freezer compartment of the refrigerator (in case appliance 32 is a refrigerator) or from the indoor environment (in case appliance 32 is an air-condition), controller 36 transmits signals to refrigerant controller 70 to control valve 74 such as to allow the refrigerant to continue from water-cooled condenser 35, preferably via expansion valve 78a, to evaporator 66 and back to compressor 62. The flow path in this operation mode of appliance 32 is illustrated in FIG. 3C. In this operation mode, the operation of fan 65 of air-cooled condenser 64 can be terminated since air-cooled condenser 64 is not utilized.

Figure 3D:
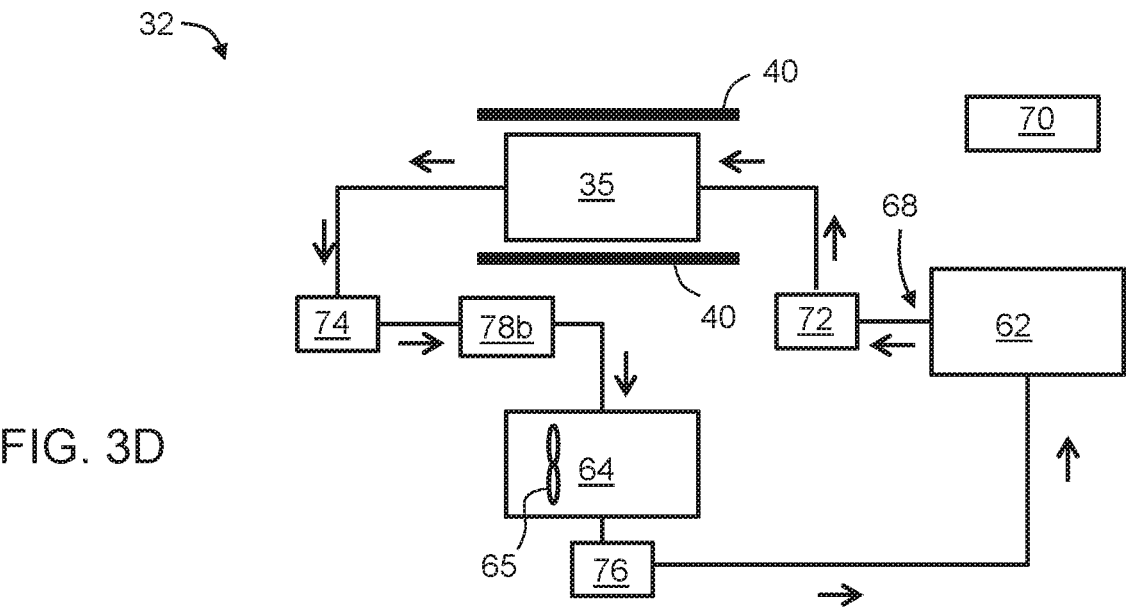

When it is desired to extract heat from the ambient air outside the refrigerator (in case appliance 32 is a refrigerator) or outside the indoor environment (in case appliance 32 is an air-condition), controller 36 transmits signals to refrigerant controller 70 to controls valve 74 such as to allow the condensed refrigerant to continue from water-cooled condenser 35, preferably via expansion valve 78b, to air-cooled condenser 64. This allows air-cooled condenser 64 to operate as an evaporator and to extract heat from the ambient air. Controller 36 also transmits signals to valve 76 to allow the evaporated refrigerant to flow back into compressor 62. The flow path in this operation mode of appliance 32 is illustrated in FIG. 3D. In this operation mode, the operation of fan 67 of evaporator 66 can be terminated since evaporator 66 is not utilized. During this operation mode, compressor 62 is typically operated at increased power consumption (e.g., about 20-30% higher) compared to the operation modes shown in FIGS. 3B and 3C, since the evaporation temperature is much higher.

It is appreciated that other configurations for appliance 32 are also contemplated. For example, instead of directing the refrigerant from the water-cooled condenser to the air-cooled condenser (FIG. 3D), appliance 32 can include an additional evaporator, outside the compartments of the refrigerator (in case appliance 32 is a refrigerator) or outside the indoor environment (in case appliance 32 is an air-condition), in which case the additional evaporator extracts the heat from the ambient air.

Figure 4A:
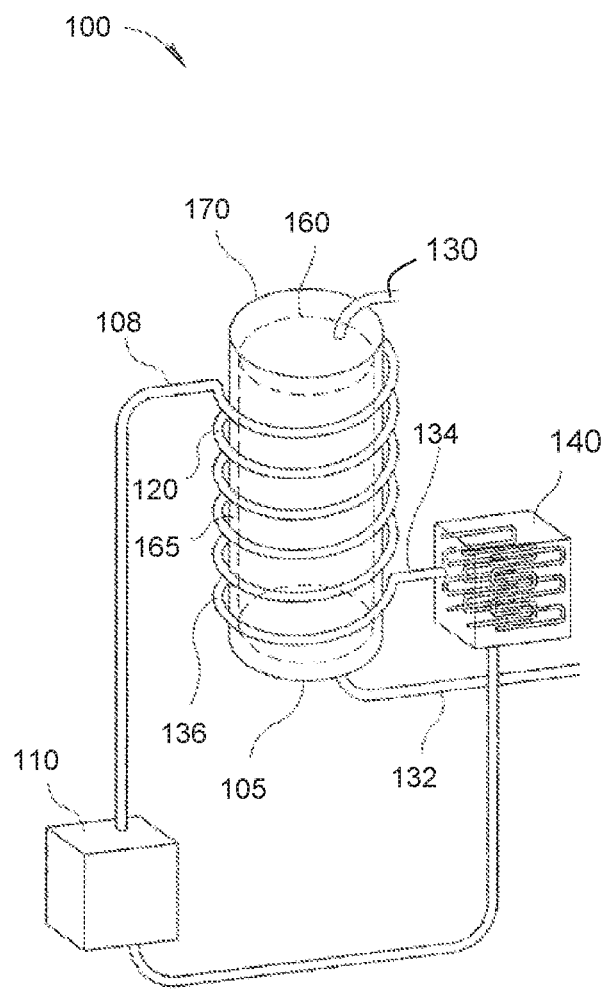
FIGS. 4A and 4B are schematic illustrations of a heat pump, which can be used according to some embodiments of the present invention.
Figure 4B:
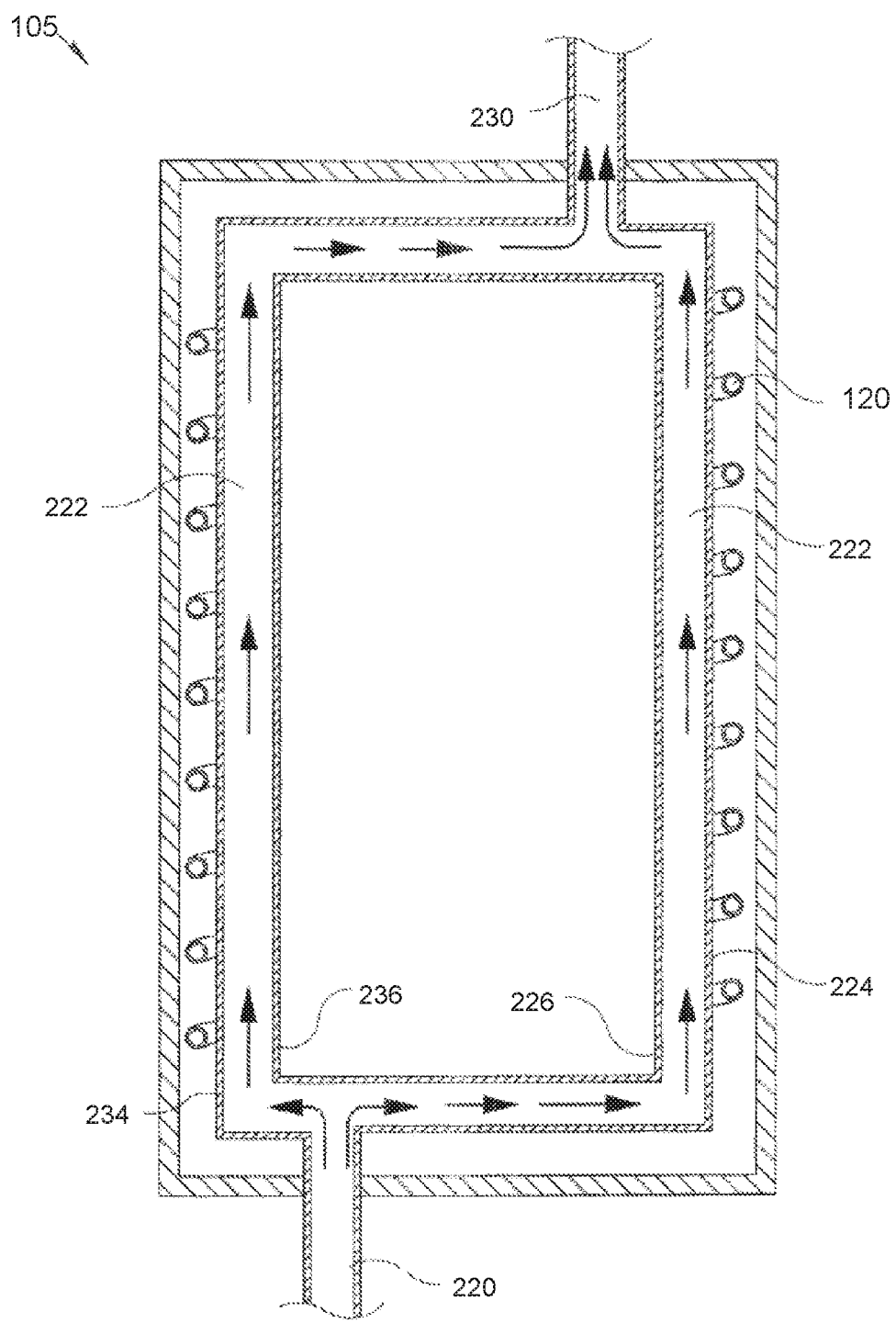

FIGS. 4A-4B are schematic illustrations of a heat pump 100, which can be used as appliance 32, according to some embodiments of the present invention. Heat pump 100 can operate according to the principles described, for example, in U.S. Published Application 2013/161/404, the contents of which are hereby incorporated by reference. Heat pump 100 includes a condenser 105 having a shell 170 and a volume reducing member 160. In accordance with the exemplary embodiment of FIG. 4A, the water is heated at a volume 165 between shell 170 and volume reducing member 160, for example within condenser 105. The shell 170 may be the sidewalls of condenser 105. In some exemplary cases, the length of the shell 170 is larger than the length of volume reducing member 160. Heated water is outputted from volume 165 between shell 170 and volume reducing member 160 to the selected inlet port of tank 24 (not shown, see FIGS. 2A-2D), via a tube 130. Cold water flows from the outlet port of tank 24 to volume 165 via a tube 132.

Heat pump 100 can further include a compressor 110 providing compressed refrigerant. The compressed refrigerant flows from compressor 110 to a refrigerant coil 120 via a compressor tube 108. The refrigerant coil 120 may surround condenser 105. The refrigerant coil 120 may reside on the internal wall or the external wall of volume reducing member 160. The volume reducing member 160 provides for local heating of water in a volume adjacent to the sidewall of condenser 105. The local heating creates a density difference that optionally and preferably enables a siphon flow between heat pump 100 and tank 24.

In some embodiments of the present invention heat pump 100 includes a vaporizer 140. Vaporizer 140 receives the outlet of refrigerant coil 120, which is outputted as water. The vaporizer 140 vaporizes the water outputted from the refrigerant coil 120 via tube 134 to compressor 110 that sucks the gas from vaporizer 140.

Condenser 105 is better illustrated in FIG. 4B. Condenser 105 includes an inlet 220 in which the water enter the condenser 105. Condenser 105 further includes an outlet 230 from which the water exits the condenser 105. Sidewalls 224 and 234 define shell 170. Sidewalls 226 and 236 define the volume reducing member. In some exemplary cases, the water flows at condenser 105 at a volume between shell 170 and the volume reducing member 160, for example at a first volume 222 defined between a sidewall 226 of the volume reducing member and sidewall 224 of the shell. The water may also flow at a second volume 222 defined between a sidewall 236 of the volume reducing member 160 and a sidewall 234 of shell 170. In some other cases, the water may flow inside the volume reducing member 160. The volume in which the water is heated is optionally and preferably positioned adjacent to a refrigerant coil 120 containing refrigerant material. The refrigerant material in the refrigerant coil 120 is typically hotter than the water and provides thermal contact onto the water.

Figure 5A:
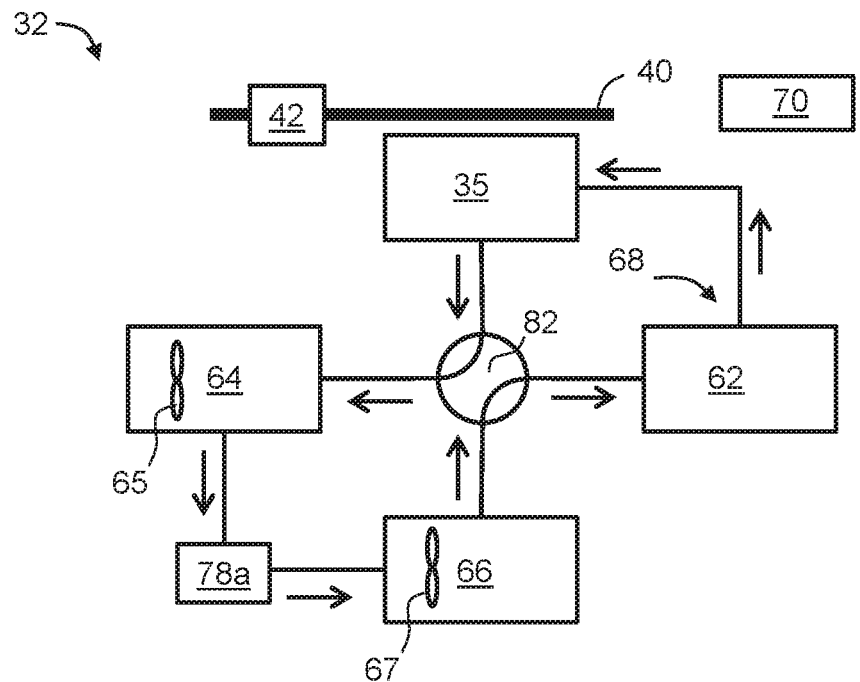
FIGS. 5A and 5B are schematic block diagrams illustrating an appliance particularly useful as an air conditioner, according to some embodiments of the present invention.
Figure 5B:
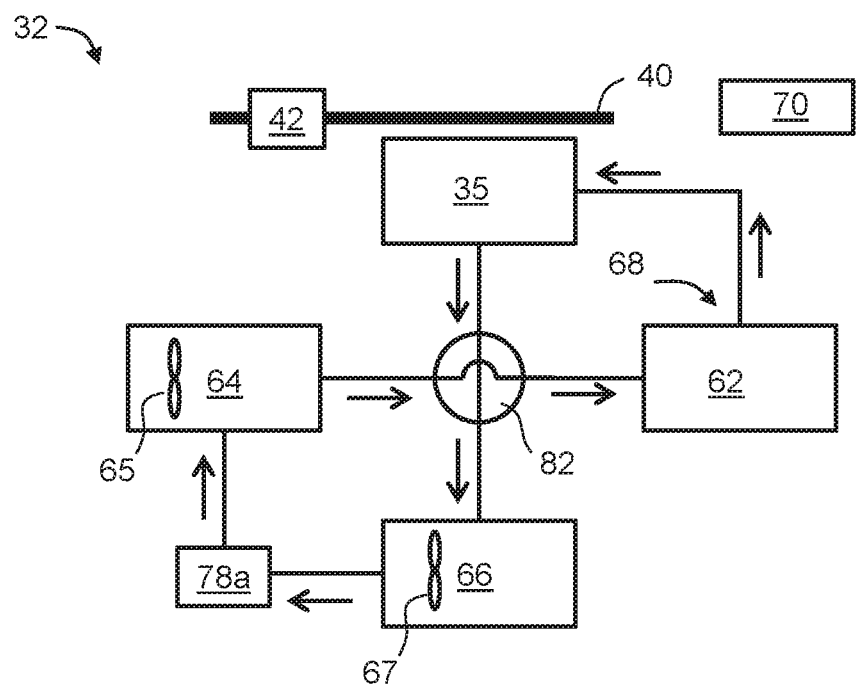

FIGS. 5A and 5B are schematic block diagrams illustrating appliance 32, particularly useful when appliance 32 is embodied an air conditioner, according to some embodiments of the present invention. In these embodiments, the circulation within conduits 40 is preferably effected by pump 42. Appliance 32 includes compressor 62, air-cooled condenser 64, water-cooled condenser 35, and evaporator 66. Evaporator 66 can be placed indoors (e.g., within a wall-mounted unit) and is configured to extract heat from the indoor environment. Condensers 64 and 35, and compressor 62 can all be placed outside the indoor environment.

Refrigerant flow can be established between compressor 62 and water-cooled condenser 35, for example, by a direct connection between them. Refrigerant flow can also be established between air-cooled condenser 64 and evaporator 66, for example, via expansion valve 78a directly connected between them. Appliance 32 can further include a valve assembly 82 that controllably establishes pairwise connections to ensure a closed loop flow of refrigerant among compressor 62, air-cooled condenser 64, water-cooled condenser 35, and evaporator 66, in a manner that is explained below. Valve assembly 82 is shown in FIGS. 5A and 5B as a 4-way valve, but any other valve assembly capable of providing pairwise connection can be used. One or both of valve assembly 82 and expansion valve 78a is/are controllable by refrigerant controller 70, itself being optionally and preferably controlled by controller 36 (not shown in FIGS. 5A and 5B, see FIGS. 2A-2D), as further detailed hereinabove.

FIG. 5A illustrates the flow direction of the refrigerant in an operation mode in which heat is extracted from the indoor environment. Compressed refrigerant exiting compressor 62 through output 68 is directed into water-cooled condenser 35 via their direct connection. Controller 36 transmits signals to refrigerant controller 70 to controls valve assembly 82 to pair between water-cooled condenser 35 and air-cooled condenser 64, and between compressor 62 and evaporator 66. This ensures the refrigerant to continue from water-cooled condenser 35 to air-cooled condenser 64, from air-cooled condenser 64, preferably via expansion valve 78a, to evaporator 66, and from evaporator 66 back to compressor 62, thereby completing a closed loop flow. Since in this operation mode the refrigerant flows from air-cooled condenser 64 to evaporator 66, evaporator 66 absorbs heat from the indoor environment and air-cooled condenser 64 releases the heat outside the indoor environment. This operation mode is referred to as an air-conditioning mode since appliance 32 operates to cool the indoor environment.

FIG. 5B illustrates the flow direction of the refrigerant in an operation mode in which heat is extracted from outside the indoor environment. Similarly to FIG. 5A, Compressed refrigerant exiting compressor 62 through output 68 is directed into water-cooled condenser 35 via their direct connection. However, unlike FIG. 5A, in this operation mode controller 36 transmits signals to refrigerant controller 70 to controls valve assembly 82 to pair between water-cooled condenser 35 and evaporator 66, and between air-cooled condenser 64 and compressor 62. This ensures the refrigerant to continue from water-cooled condenser 35 to evaporator 66, from evaporator 66, preferably via expansion valve 78a, to air-cooled condenser 64, and from air-cooled condenser 64 back to compressor 62, thereby completing a closed loop flow. Since in this operation mode the refrigerant flows from evaporator 66 to air-cooled condenser 64, air-cooled condenser 64 serves as an evaporator that absorbs heat from outside the indoor environment and evaporator 66 serves as a condenser that releases heat to the indoor environment. This operation mode is referred to as a heat-pumping mode since appliance 32 operates to heat the indoor environment.

During a time period in which the heating process of the water in tank 24 is executed, controller 36 controls pump 42 to circulate water through conduits 40. In any of the air conditioning and heat-pumping modes described above with reference to FIGS. 5A and 5B, heat is released from water-cooled condenser 35 so that water is heated by water-cooled condenser 35. In the air conditioning mode (FIG. 5A), condensation occurs in water-cooled condenser 35, so that the average condensation temperature is less compared to conventional air conditioners. This is advantageous because reduced average condensation temperature improves the operation efficiency of an air conditioner. In this operation mode, the operation of fan 65 of air-cooled condenser 64 can be terminated since the refrigerant is condensed in water-cooled condenser 35. In the heat-pumping mode (FIG. 5B), the energy that is supplied to appliance 32 via compressor 62 is used for releasing heat both by evaporator 66 (which now serves as a condenser) and by water-cooled condenser 35. In this operation mode, the operation of both fans 65 and 67 is preferably maintained to allow evaporator 66 to efficiently release heat to the indoor environment, and to allow air-cooled condenser 64 (which now serves as an evaporator) to efficiently absorb heat from the outdoor environment.

During a time period in which the heating process of the water in tank 24 is not executed (for example, based on a selected timing protocol, and/or when the temperature in tank 24 reaches a predetermined level), controller 36 ceases the operation of pump 42. This results in no circulation of water in conduit 40 so that water-cooled condenser 35 is only mildly cooled or not cooled by the water. The refrigerant thus flows through water-cooled condenser 35 without being condensed. Air cooling, on the other hand, is not affected by the operation of pump 42. Therefore, in the air conditioning mode, the refrigerant is condensed in air-cooled condenser 64 and in the heat-pumping mode the refrigerant is condensed in evaporator 66.

When the temperature in the indoor environment reaches a predetermined temperature level, the operation of fan 67 of evaporator 66 can optionally be terminated. This embodiment is useful in both the air-conditioning and heat-pumping operation modes. During the time period in which the heating process of the water in tank 24 is not executed, once the temperature in the indoor environment reaches the predetermined temperature level, the operation of compressor 62 can be terminated as well. On the other hand, during the time period in which the heating process of the water in tank 24 is executed, the operation of compressor 62 can be maintained even after the operation of fan 67 is terminated, thereby increasing the portion of the energy that is exploited for heating the water in conduit 40. The predetermined temperature level in the indoor environment and/or tank 24 can be selected by the operator, for example, using interface 44 (not shown, see FIGS. 2A-D).

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find support in the following examples.

EXAMPLES

Reference is now made to the following examples, which together with the above descriptions illustrate some embodiments of the invention in a non-limiting fashion.

Exemplary Timing Protocol

Figure 6:
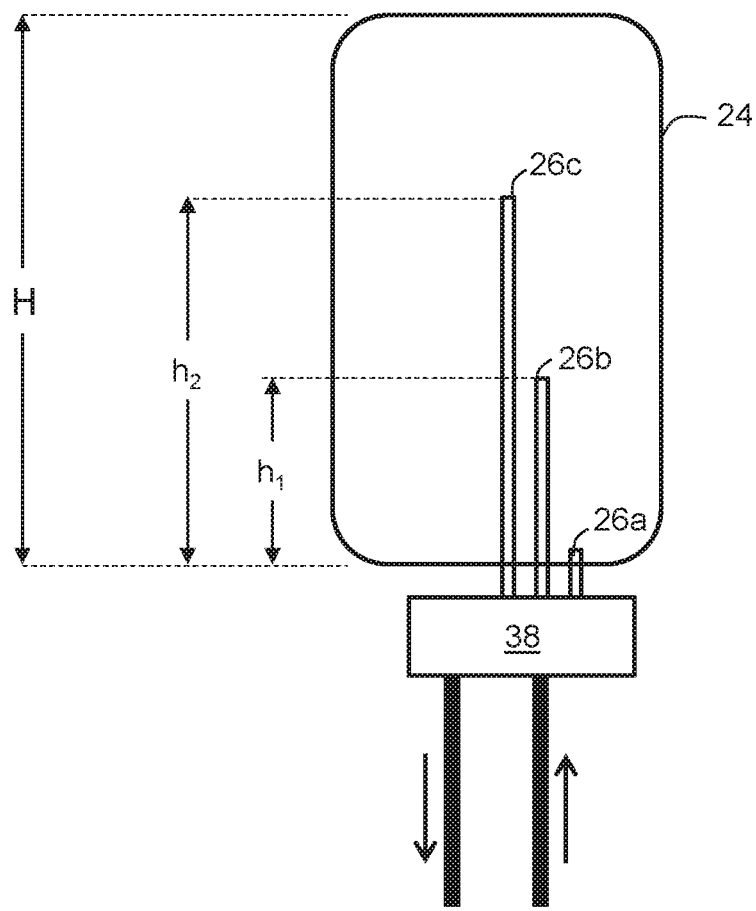
FIG. 6 is a schematic illustration of a water tank according to some embodiments of the present invention.

Consider, for example, water tank 24, as illustrated in FIG. 6, having a height H. In this example, which is not to be considered as limiting, tank 24 has a port 26a located at the bottom of the tank, a middle port 26b located at height $h_1=H/3$ above the bottom of the tank, and an uppermost port 26c located at height $h_2=2H/3$ above the bottom of the tank. The section of the tank below port 26b (the lowest third of the tank in this example) is denoted hereinbelow section A, the section of the tank between ports 26b and 26c (the middle third of the tank in this example) is denoted hereinbelow section B, and the section of the tank above port 26c (the uppermost third of the tank in this example) is denoted hereinbelow section C. Suppose that the internal volume of tank 24 is about 150 liters, and that the shape of the tank is generally cylindrical so that when the tank is full, each of sections A, B and C contains about 50 liters of water.

Assume, for example, that on a cold day, at about 7 AM, the average water temperatures in sections A, B and C are: about 15° C., about 20° C. and about 35° C., respectively. Assume further that it is desired to heat the 100 liters of the water at the upper two-thirds (sections B and C) to about 55° C. by 6 PM on the same day, using a refrigerator (not shown) having a normal average power consumption of about 200 W during refrigeration operation.

The required energy for heating section C is 50(55-35)=1000 KCal=1162 W hr, and the required energy for heating section B is 50(55-20)=1750 KCal=2034 W hr, where W hr abbreviates watt×hour.

When the temperature of the freezer compartment of the refrigerator is about −18° C., the condenser of the refrigerator dissipates about 400 W. Suppose that in a normal refrigeration operation, the compressor of the refrigerator operates at a duty cycle of 27 minutes per hour (about 41.6%), namely about 5 hours of operations during the 11 hour time period from 7 AM to 6 PM. When the condenser receives water from the tank, the amount of heat that it delivers to the water during these 5 hours of operation is about 5×400=2,000 W hr or equivalently 1720 KCal. When this amount is delivered to 100 liters of water of sections A and B, it increases the temperature of the water by about 1720/100=17.2° C.

The initial average temperature of sections A and B is (15+20)/2=17.5° C. Therefore, extracting water from the tank through port 26a, heating the extracted water by the condenser, and delivering the heated water back to the tank through port 26b, can result in an average temperature of 17.5+17.2=34.7° C. at sections A and B.

The amount of heat that is still required to reach the desired temperature (55° C. at sections B and C), is 1162 W hr for the 50 liters in section C, and 50(55−34.7)=1015 KCal=1180 W hr for the 50 liters in section B. This amount of heat (1162+1180=2342 W hr) can be delivered, for example, by extracting heat from the ambient air instead of from the freezer compartment of the refrigerator. For example, the compressor can generate flow of refrigerant into the air-cooled condenser of the refrigerator, thereby causing the air-cooled condenser to function as an evaporator that absorbs heat from the ambient air. Under an assumption of ambient temperature of about 20° C., vaporization temperature of about 10° C., and cycle's Coefficient Of Performance (COP) of about 3.45, the missing energy of 2342 W hr can be delivered by increasing the vaporization temperature for an overall (intermittent) period of about 160 minutes. This intermittent period can be distributed generally uniformly over the desired period of time (7 AM to 6 PM), for example, about 15 minutes per hour.

Thus, in a cold season, the following timing protocol can be employed, at each one-hour period from 7 AM to 6 PM: (i) 27 minutes of operation at power consumption of 200 W, during which heat is pumped from the freezer of the refrigerator, and water is extracted through port 26a and delivered through port 26b; (ii) 15 minutes of operation at elevated power consumption of 260 W, during which heat is pumped from the ambient air, and water is extracted through port 26b and delivered through port 26c; and (iii) 18 minutes of pause.

In warmer seasons, the desired temperature can typically be reached without pumping heat from the ambient air and so it is not required to execute the heat pump cycle. Thus, during warmer seasons, phase (ii) is preferably not executed, and in phase (i) water is preferably extracted from the tank through port 26b and delivered to the tank through port 26c. This timing protocol can increase the average temperature of the water throughout the tank from about 23° C. to about 45° C.

At night time (from 6 PM to 7 AM on the next day) the thermal energy output is similar to that of the daytime because less refrigeration is typically necessary at night.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A method of heating water in a single water storage tank, the method comprising:
   selecting, automatically, a controllable outlet port and, automatically, selecting a controllable inlet port from at least three controllable ports located in the single water storage tank at different heights along a vertical direction, said controllable outlet port being below said controllable inlet port;
   extracting water from said controllable outlet port;
   supplying said extracted water to an external heat exchanger configured for heating said extracted water in which said external heat exchanger comprises a water-cooled condenser of a refrigerator;
   delivering heated water from said external heat exchanger to said selected controllable inlet port; and
   transmitting a signal from an operation mode controller to a refrigerant controller of the refrigerator to changing the flow direction of the refrigerator's refrigerant in order to operate the refrigerator during a non-cooling cycle of the refrigerator's refrigeration cycle to extract heat from ambient air, with regard to a temperature goal at one or more sections of the water storage tank.

2. The method of claim 1, being executed in a plurality of execution cycles wherein in at least one of said plurality of execution cycles said controllable outlet port is other than a lowermost port of said at least three controllable ports.

3. The method according to claim 1, wherein said at least three controllable ports comprise a lowermost port, a middle port and an uppermost port, wherein the method is executed in a plurality of execution cycles, and wherein in at least one of said execution cycles, said controllable outlet port is said middle port and in at least one of said execution cycles, said controllable inlet port said is said middle port.

4. The method of claim 1, comprising selecting said controllable outlet port from a first pair of at least four ports, and selecting said controllable inlet port from a remainder of said at least four ports.

5. The method according to claim 1, wherein said selecting, automatically, of said controllable outlet port and, automatically, selecting a controllable inlet port is according to a predetermined temperature protocol.

6. The method according to claim 1, further comprising measuring a temperature of said water at said heat exchanger, wherein said selecting automatically, of said controllable outlet port and said selecting, automatically, of said controllable inlet port is based on said measured temperature.

7. The method according to claim 1, wherein said controllable inlet port is selected such that a temperature at said controllable inlet port is higher than a temperature of said delivered heated water.

8. The method according to claim 1, being executed intermittently.

9. A system for heating water, the system comprising:
   a single water storage tank for holding the water and comprising at least three controllable ports located in said single water storage tank at different heights along a vertical direction;

a heat exchanger external to said single water storage tank;

an operation mode controller, supplemented by a controllable valve system, said operation mode controller configured to automatically select a controllable outlet port and a controllable inlet port from said at least controllable three ports; and an arrangement of conduits arranged to circulate water from said single water storage tank through said selected controllable outlet port, via said heat exchanger for heating of said circulated water, and into said single water storage tank through said selected controllable inlet port, wherein said heat exchanger comprises a condenser of a refrigerator and the operation mode controller is configured to transmit a signal to a refrigerant controller of the refrigerator to change the flow direction of the refrigerator's refrigerant in order to operate the refrigerator during the non-cooling cycle of the refrigerator's refrigeration cycle to extract heat from ambient air and the operation mode controller is configured to operate the refrigerator during the non-cooling cycle of the refrigerator's refrigeration cycle with regard to to a temperature goal at one or more sections of the water storage tank.

10. The system according to claim 9, further comprising a pump for effecting said circulation.

11. The system according to claim 9, wherein said controller is configured to execute a timing protocol for said selection of said controllable inlet port and said controllable outlet port, and wherein said timing protocol is determined with respect to the season and/or climate and/or ambient temperature.

12. The system according to claim 9, further comprising a temperature sensor for measuring a temperature of said water at said condenser, wherein said automatic selection of said controllable inlet port and said controllable outlet port is based on said measured temperature.

13. The system according to claim 9, wherein said heat exchanger comprises a condenser of a refrigerator having a freezer compartment.

14. The system according to claim 13, wherein the system is configured to allow intermittent execution thereof.

15. The system according to claim 14, wherein said intermittent execution comprises at least one execution cycle during which said condenser extracts heat from said freezer compartment.

16. The system according to claim 14, wherein said intermittent execution comprises at least one execution cycle during which a condenser extracts heat from ambient air outside said refrigerator.

17. The system according to claim 9, wherein there are at least four ports located at different heights of the single water storage tank.

18. The system according to claim 9, wherein the operation mode controller is configured to operate a timing protocol for the automatic selection of the ports based on season and/or climate.

19. The method according to claim 1, wherein said at least three controllable ports comprise a lowermost port, a second lowest port and an uppermost port, and the method comprises extracting water from the lowermost port; returning heated water to the second lowest port during the refrigerator's cooling cycle; and extracting water from the lowermost port or the second lowest port and returning heated water to the uppermost port after heat is exchanged with the ambient air during the non-cooling cycle of the refrigerator.

* * * * *